United States Patent
Mainwaring et al.

(10) Patent No.: US 6,282,202 B1
(45) Date of Patent: Aug. 28, 2001

(54) METHOD FOR INTERNAL COMMUNICATION IN A TELECOMMUNICATIONS SYSTEM

(75) Inventors: Keith Mainwaring, Huddinge; Göran Hågård, Hägersten; Johan Törnström, Haninge; Mårten Sundquist, Hägersten; Börje Ohlman; Mats Ragnar Svensson, both of Stockholm; Sven Bäckström, Nacka; Hans Alvenkrona, Gustavsberg; Mikael Lennart Hillborg, Uppsala, all of (SE); Leslie Graf, Melbourne (AU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/817,419
(22) PCT Filed: Apr. 18, 1997
(86) PCT No.: PCT/SE95/01263
 § 371 Date: Jul. 17, 1997
 § 102(e) Date: Jul. 17, 1997
(87) PCT Pub. No.: WO96/13112
 PCT Pub. Date: May 2, 1996

(30) Foreign Application Priority Data

Oct. 24, 1994 (SE) .................................................. 9403641

(51) Int. Cl.[7] .................................................. H04L 29/06
(52) U.S. Cl. .......................... 370/410; 370/522; 379/220
(58) Field of Search .................................... 370/384, 400, 370/410, 467, 522; 379/220, 229, 230

(56) References Cited

U.S. PATENT DOCUMENTS

| | | |
|---|---|---|
| 4,967,193 | 10/1990 | Dyke et al. . |
| 5,007,080 | 4/1991 | MacMillan et al. . |
| 5,073,890 | 12/1991 | Danielsen . |
| 5,184,346 | 2/1993 | Kozaki et al. . |
| 5,239,542 | 8/1993 | Breidenstein et al. . |
| 5,251,255 | 10/1993 | Epley . |
| 5,276,816 | 1/1994 | Cavendish et al. . |
| 5,377,186 | * 12/1994 | Wegner et al. .................. 379/230 |
| 5,517,563 | 5/1996 | Norell . |
| 5,521,902 | * 5/1996 | Ferguson ........................ 370/252 |
| 5,550,914 | * 8/1996 | Clarke et al. ................... 379/230 |

FOREIGN PATENT DOCUMENTS

| | | |
|---|---|---|
| 350 844 | 1/1990 | (EP) . |
| 432 924 | 6/1991 | (EP) . |
| 504 087 | 9/1992 | (EP) . |
| 505 092 | 9/1992 | (EP) . |
| 513 799 | 11/1992 | (EP) . |
| 555 997 | 8/1993 | (EP) . |
| WO94/06251 | 3/1994 | (WO) . |

OTHER PUBLICATIONS

G.J. Holzmann, Design and Validation of Computer Protocols, AT&T Bell Laboratories, Prentice Hall, pp. xi, 12, and 21–22.

* cited by examiner

Primary Examiner—Ricky Ngo
(74) Attorney, Agent, or Firm—Burns, Doane, Swecker & Mathis, L.L.P.

(57) ABSTRACT

In traffic processes in a telecommunication system there is internal communication between service controlling entities which may belong to logical nodes in the same or different applications. Such a service controlling entity may be a service process controlling a service for a party of a call. The communication between the service controlling entities is controlled by rules given in a generic protocol. These rules imply lack of messages and use only of protocol parameters in the form of indivisible information transmission elements. Based upon the generic protocol, service protocols are specified, each corresponding to its service, and a protocol managing entity within an application handling the protocol management of a certain service according to the service protocol. The information elements are distributed by a communication service having a parameter distribution function for the protocol parameters, by transferring data between the protocol managing entities.

106 Claims, 7 Drawing Sheets

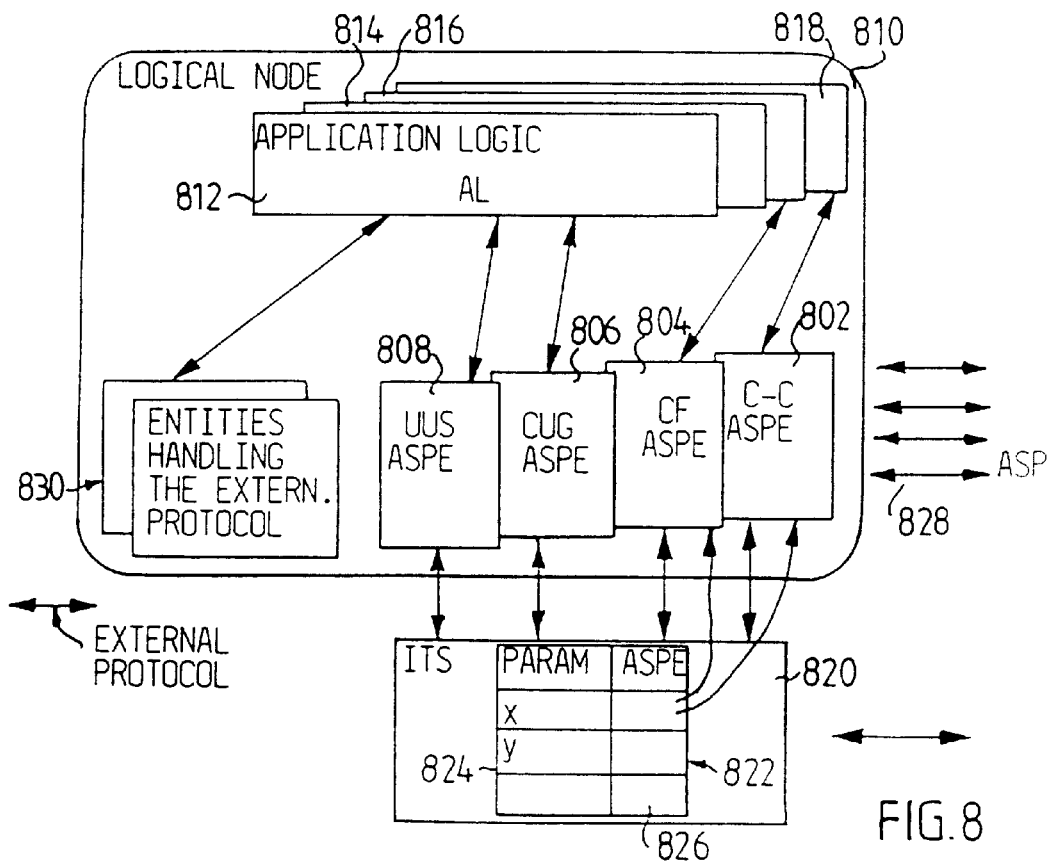
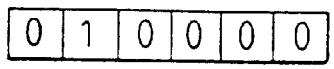
FIG. 9a
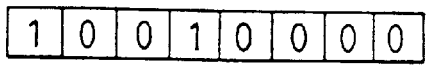
FIG. 9b
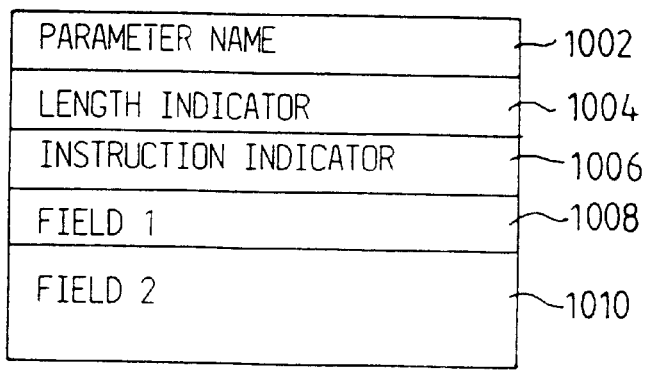
FIG. 10

METHOD FOR INTERNAL COMMUNICATION IN A TELECOMMUNICATIONS SYSTEM

THE TECHNICAL FIELD OF THE INVENTION

The present invention generally relates to telecommunications systems, and specifically to software systems for a telecommunications system, that includes hardware and software components with specific functions, and to which several users are connected. The invention also relates to methods of structuring software in telecommunications systems of the kind just mentioned.

More specifically the invention relates to internal communication between service controlling entities in traffic courses in a telecommunication system, said service controlling entities belonging to logical nodes in the same or different telecommunication service networks.

With service controlling entities is here meant e.g. service processes controlling service for a part in a call. Among types of service processes which may occur in a communication network may be mentioned traffic control processes for user access and network access.

By saying that a service controlling entity belongs to a logical node is here meant that it shall be specified in the logical node. The realization thereof in software is constituted by executing functions in the logical node. The software for the service controlling entities in a logical node may be distributed on different processors controlled by a distributed operating system. The concept of a logical node will here mean a group of functions to be installed together in a system. The logical node is defined in a reference model for the logical network and is specified in a node function model. Typical logical nodes are N-ISDN (narrow band ISDN) network access, N-ISDN user access, and B-ISDN (broad band ISDN) network access and B-ISDN user access.

By the concept of telecommunications service networks, or shortly below also service networks, is here furthermore meant a logical network for telecommunications services. Examples of service networks are PSTN, N-ISDN, B-ISDN, PLMN-GSM, VPN etc.

DESCRIPTION OF RELATED ART

In the U.S. patent application Ser. No. 07/723,166 a software system for controlling a telecommunication exchange is described. The system in question includes a plurality of application modules located in the exchange and intended to provide telecommunications services for users connected to the exchange. Each application module contains control instructions and data for implementing a specific telecommunications application. Resource modules provide common functional elements used by the application modules. The resource modules have access to and control hardware components of the exchange necessary for performing the specific functional activities. Communications may be established between each of the application modules and each other application module and each resource module in the exchange for providing the telecommunications services of each application module to users without the use of control instructions or data from any other application module. Network protocols control the communication between the application modules in the exchange. The communications between the resource modules and between the application modules and the resource modules in the exchange is carried through via interfaces.

In EP 0 432 924 a data communication architecture is described in which high level communication services for a central computer are arranged in independent horizontal functions which are managed in parallel. Conditional dependencies between the horizontal functions are solved by a means establishing interfaces between the horizontal functions and an application layer of the central computer. The communication is improved by admitting adaptive specification of a high level protocol used in the architecture for providing the high level services. This adaptive specification may be initiated in response to changing user demands or varying network parameters. In the protocol specification suitable values of parameters for the horizontal functions are selected, which are parametrically programmable.

In EP 0 513 799 a system is described for supporting entering or referencing a data value or a structural value which constitutes a component of a protocol data unit. The syntax of this unit is defined in accordance with ISO8824 and it is coded/decoded in accordance with ASN.1 rules in ISO8825.

In the U.S. Pat. No. 4,967,193 a method is described for communication with a protocol used in a telecommunication system with at least one central computer connected to a plurality of digital interface units via a communication module. Each digital interface unit is connected to a plurality of channel units. From the computer to the communication module an instructional message is sent with at least a first address of a selected interface unit, an address of a selected channel unit, a second address which is essentially identical to the first interface unit address, and a first information part. The instructional message from the communication module is sent to the digital interface units, the selected interface unit receiving the instructional message. In the selected interface unit the first address is removed from the instructional message for forming a modified message. The modified message is sent from the selected interface unit to the channel units, the selected channel unit receiving the modified message. The selected module provides a response message to the computer. The protocol provides a response format identifying the responding module, the type of response, and, in case of error, where the error was detected and which type of error there was.

In the U.S. Pat. No. 5,276,816 a system is described for interpreting messages sent from an input/output unit to an application object in an object oriented environment, so that the message interpretation of these messages remains consistent independent of the input/output unit used for generating them. Dynamical binding is used for interpreting all object-object interactions which may appear. This admits the use of further input/output units in the object oriented environment without the need for updating all application objects therein.

In the European patent application 0 505 092 a system is described for use by a computer for controlling a device for providing a plurality of services for a plurality of entities. Each entity exactly corresponds to one of the services and each service has its own copy of the code defining the service. The system associates a process executing the service with every service. The code for a service defines a finite state machine which is continuously executed by the service process. In a distinct state the state machine may move along a decision diagram which is directly accessible to the process. Measures to be taken at the passing of a node in the decision diagram may be defined in the state machine. The service process communicates with other processes and with itself via interprocess messages. Each state of the state machine includes event handlers for responding to messages which have been received by the service process.

EP 555 997 relates to protocol controlled communication between entities in a distributed computer system. A generic protocol is used in which it is possible to send a protocol description in a language which is independent of any applications. Each entity has the possibility to interpret which protocol is described in the generic protocol guided by the application independent language. Alternatively, the protocol interpreter in a receiving entity may be equipped with a protocol description in a memory, whereby it is only necessary to send a protocol identifier in the generic protocol.

WO 94/6251 i.a. discloses a signalling protocol for telecommunications networks. The nodes of the network are interconnected with a connection network. The communication between the nodes is performed with two different protocols, one basic protocol used for providing signal paths between service related software groups and one or more specific protocols.

EP 350 844 describes a method for transferring program parameters from an exchange to terminals. The transfer is based on a message oriented protocol using a signalling channel for transferring information between these units. The program parameters are used in the terminals i.a. for controlling procedures for different services and are sent to the terminals embedded in a parameter message.

U.S. Pat. No. 5,239,542 discloses a communications system converting transferring formats and signalling protocols so as to enable communication between circuits in systems originating from different networks. The system is characterized by a processor translating the communication to common protocol independent messages.

Within the technical area in question there are, moreover, also the following publications.

U.S. Pat. No. 5,007,080, "Communication system supporting remote operations".

U.S. Pat. No. 5,073,890, "Remote agent operation for automatic call distributors".

EP 0 504 087, "Synchronizing asynchronous protocol interactions between peer layers in different modes of a layered communication network".

U.S. Pat. No. 5,251,255, "Processing interactions among telecommunications call features."

U.S. Pat. No. 5,184,346, "Switching system".

"Design and validation of computer protocols", Gerard J. Holzmann, AT&T Bell Laboratories, PRENTICE HALL.

SUMMARY

A first object of the invention is to provide, for internal communication between service controlling entities in traffic courses in a telecommunications system, a generic communication method without application dependencies which thereby facilitates the addition of new services belonging to the same or different telecommunications service networks.

A second object of the invention is to provide a generic communication method of the kind mentioned, which enables the creation of service protocols not containing application logic, which thereby can be used for communication between service controlling entities belonging to a great number of varying telecommunications service networks.

A third object of the invention is to provide a generic communication method using a protocol model which is distributed rather than monolithic so that application specific parts can be located in their own environment.

A fourth object of the invention is to provide a generic communication method admitting the creation and use of service protocols having forward and backward compatibility, i.e. it should be possible to extend such a protocol without making existing parts erroneous or meaningless.

A fifth object of the invention is to replace earlier concepts for communication between service controlling entities with a transport service which quite simply moves information between equivalent entities and thereby improves the capacity by reduced management.

A sixth object of the invention is to provide a generic communication method which with respect to its basic information exchange, in accordance with ITU-T (former CCITT) Q.2764, has a mechanism indicating what a service controlling entity should do with received information which is not understood, which implies that the interaction logic required in the service controlling entity is simplified.

A further object is to provide a communication method making it possible to update parts of a telecommunications system without the need to upgrade others.

According to a main aspect of the invention, the internal communication between service controlling entities in traffic courses in a telecommunications system is controlled by means of rules stated in a generic protocol model.

According to another main aspect relating to software systems for telecommunications systems, including hardware and software components with specific functions and to which a plurality of users are connected, rules stated in a generic protocol model are used for controlling the internal communication between service controlling entities in traffic courses in the telecommunications system.

According to another main aspect relating to structuring of software in a telecommunications system including hardware and software components with specific functions and to which a plurality of users are connected, software components based on rules stated in a generic protocol model are stored in the system, for controlling of internal communication between service controlling entities in traffic courses in the telecommunications system.

According to a first sub-aspect it is common to the above mentioned main aspects that the rules in the generic protocol model prescribe lack of messages, and use of only protocol parameters in the form of indivisible information transfer elements. These information elements are distributed by a communication service with a parameter distribution function for said parameters.

According to a second sub-aspect it is common for the three main aspects that based upon the generic protocol model, service protocols corresponding to a respective service, are specified.

According to a third sub-aspect it is common for the three main aspects that the rules in the general protocol model prescribe the use of protocol parameters in the form of indivisible information transfer elements.

According to a fourth sub-aspect it is common to the three main aspects that the rules in the generic protocol model prescribe the use of protocol parameters, which are distributed by a communication service with a parameter distribution function for said parameters.

According to a fifth sub-aspect it is common for the three main aspects that the rules in the generic protocol model prescribe the lack of messages and the use of only protocol parameters.

According to an essential embodiment of the invention, service protocols corresponding to a respective service are specified based upon the generic protocol model.

Preferably a number of defined protocol parameters are associated with the generic protocol model, which constitutes the smallest data unit possible to transfer in the service protocol When specifying a service protocol, a number of parameters suitable for the service are chosen arbitrarily, and new protocol parameters are defined at need. There is a protocol specification for each service protocol where this includes a list of sent and received parameters.

In accordance with an essential embodiment of the invention the service protocols lack application logic.

Preferably a protocol handling entity within an application takes care of the protocol handling for a certain service in accordance with the service protocol.

In case of communication between two service controlling entities the communication service transfers data between the protocol handling entities, the parameter distribution function is present in the communication service specifying to which protocol handling entities each protocol parameter shall be sent, and two parameter distribution lists are used, viz. one function used for the originating service controlling entity and one used by the terminating service controlling entity.

In case of system upgrading new or modified protocol handling entities are loaded, which will affect the parameter distribution function during execution.

Application logic instructs the protocol handling entities through methods to send parameters to the communication service whereupon the application logic orders the communication service to send a message.

The configuration of a protocol handling entity is determined in connection with the application design in a way that the structure essentially is not known by other logical nodes.

For each protocol handling entity, the application designer specifies the parameters required to generate events to the service, whereby the state machine for the service is located in the application logic.

One interface per service between the application logic and a protocol handling entity includes a specification of events that are to be sent from the protocol handling entity to the application logic, and methods that are to be sent from the application logic to the protocol handling entity.

At reception of a parameter, or a specific set of parameters, from the communication service, a protocol handling entity emits an event to the application logic.

The application logic includes all logic for traffic handling, handling of supplementary services and interaction between services.

Each protocol parameter is associated with an instruction indicator indicating what a receiving protocol handling entity shall do with a parameter which is not understood.

The communication service uses a set of messages and a corresponding state machine, said messages having no meaning to the service protocol and need not be known by the application designer.

The invention includes design of service protocols which can survive in an environment of changing applications. While taking the basic principles for communication into consideration this is obtained by avoiding to build in application dependencies in the basic concept of the protocol model.

The invention is based upon the understanding that application logic and protocol must be separated. In practice this implies that the state machine for the service, time measuring functions, etc. are not to be located in the functional units forming the service protocol. Only by means of separating application logic and service protocol, the protocol may attain application independence and thereby support communication between services which are specified to be able to interact in a great number of varying telecommunications service networks.

The model on which the protocol is based is distributed rather than monolithic. This includes locating application specific parts in their own environment. It is possible to use protocol handling entities which each relates to a particular service in the application logic. By this distributed solution and compatibility forwards, i.e. possibility to add new service protocols, and backwards, i.e. possibility to develop a service protocol without needing to update designed service controlling entities, the demands on communication between services in different logical nodes are fulfilled. A successful interaction between services requires logical decisions, implying that the service logic in each service controlling entity must understand the services with which it can interact.

An important mechanism for the basic information exchange is instruction indicators which are sent with each protocol parameter and which indicate what a receiver shall do with information which it does not understand. This includes that each parameter may be sent from one protocol unit to another one, whereby the required interaction logic is simplified. Basic functions such as reject parameter, release call, and inform sender, are possible. This covers the required function in most cases. It should particularly be emphasized that this mechanism is forward compatible, i.e. it can be developed and be compatible backwards.

The instruction indicator mechanism allows that parameters at each point of time may be added to the service protocol without disturbing interacting services having no interest in the information. This in turn implies that services may be developed without disturbing other services in the system. This simplifies service development and successive introduction of a new service in one part of a system in operation without disturbing other parts of the system.

Another aspect worth mentioning is that only data operate the state machines operating within the respective service. This implies that there is no need of defining global states or events which extend over several services belonging to the same or different telecommunications service networks. The service protocol will carry the data that each service will use for generating its own state transitions. This in turn implies that the service protocol itself remains application independent since no application state dependency exists in the service protocol itself.

The need of market adaptions is handled in the same way as individual services, i.e. market parameters are created to carry the market information, changes in logic due to market functionality being handled in the application logic and not in the protocol. Hence market functions only affect the services which are required to functionally support them.

Service protocols are specified and implemented per service, whereby it will be easier to add and remove services.

To sum up, the protocol achieves the highest possible flexibility by the freedom offered in connection with development of services, addition of new services, specification and implementation of service protocols per service, and lack of protocol global messages and states.

BRIEF DESCRIPTION OF THE DRAWINGS

Embodiments of the invention will now be described more closely below with reference to the attached drawings, in which FIG. 1 schematically illustrates a program controlled telecommunications system in accordance with the state of the art, FIG. 2 schematically illustrates the structure of a telephone exchange included in a telecommunications system in accordance with the state of the art, FIG. 8 shows a logical node more in detail, illustrating i.a. the interaction between application logic, protocol handling entities and communication service, FIGS. 9a and 9b show examples of two editions of an instruction indicator bitmap, FIG. 10 shows the structure of a parameter included in the protocol in accordance with the invention.

DETAILED DESCRIPTION OF EMBODIMENTS

As will appear more closely below the invention relates to internal communication between service controlling entities in traffic courses in a telecommunications system. By service controlling entities is here meant e.g. service processes controlling a service for one party of a call. Among types of service processes which can appear in a communication network may be mentioned traffic control processes for user access and network access.

That a service controlling entity belongs to a logical node means that it should be specified in the logical node. Its realization in software is constituted by the executing functions in the logical node. The software for the service controlling entities in a logical node may be distributed on different processors controlled by a distributed operating system. By a logical node is here meant a group of functions which shall be installed together in a system.

As far as the more detailed description below does not state otherwise, the invention is e.g. applicable in environments of the kind presented in the above mentioned U.S. application Ser. No. 07/723,166, or in the Swedish patent application 9202489-2, said publications being incorporated herein by reference.

Figure 1:
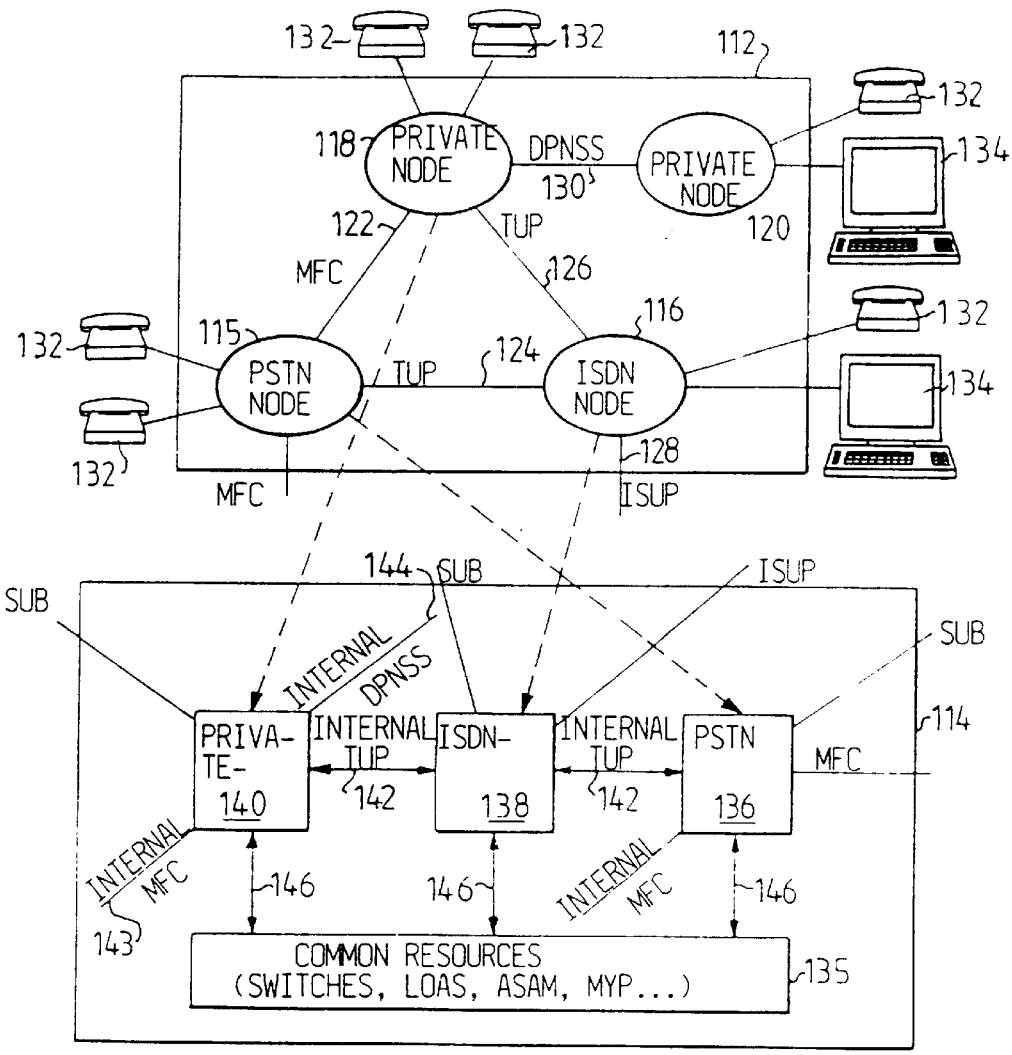

In FIG. 1 a software system known from the U.S. application Ser. No. 07/723,166 is shown, which e.g. can be a part of the AXE system. In its upper part the figure shows a part 112 of a telecommunications network which is illustrated as comprising a plurality of nodes. The way in which each of these nodes communicates with other nodes via certain defined protocols is reflected in a software architecture which is included in a program memory controlled telephone exchange 114 and which will be described more closely below.

More particularly, a node 115 included in a PSTN-network is shown in the telecommunications part 112 as e.g. being interconnected to a node 116 included in an ISDN-network, the nodes being both connected to a node 118 included in a private network. The private node 118 in turn is connected to another node 120 included in a private network. The node 115 communicates with the node 118 via a MFC (Multi-Frequency Code) protocol 122, whereas the node 116 communicates both with the node 115 and the node 118 via CCITT-TUP protocols 124 and 126. The ISDN node 116 can communicate with other ISDN nodes via an ISUP protocol 128 and the nodes 120 and 118 included in private networks communicate with each other via a DPNSS protocol 130. Telephone subscribers 132 are connected to each of the nodes 115–120, whereas the node 120 and the ISDN node 116 may also have data communication subscribers 134 connected thereto.

The functionality in the telecommunications network 112 is included in the telephone exchange 114. The common functionality for the logical nodes 115–120 is included in common resources 135. The telephone exchange 114 includes the specific functionality of the node 115 in a PSTN application module 136. In a similar way the specific functionality of the ISDN node 116 is included in an ISDN application module 138, whereas the specific functionality of the private node 118 is included in an application module 140. The application modules 136–140 include service handling data programs and are intended to provide telecommunications services for users connected to the telephone exchange 114. Each application module includes control instructions and data implementing the specific functionality for a certain type of node.

The application modules 136–140 are illustrated as communicating mutually via protocols, such as an internal TUP protocol 142, an internal MFC protocol 143, and an internal DPNSS protocol 144. The common resources 134 are used via interfaces 146.

Figure 2:
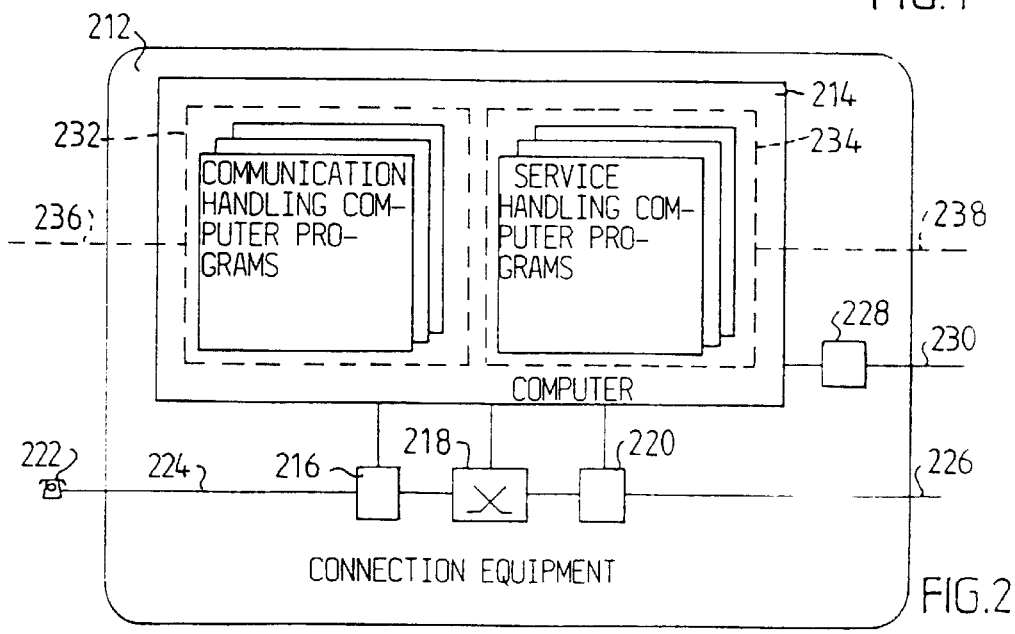

In FIG. 2 a program memory controlled telephone exchange 212 is shown, of the kind appearing e.g. from the above mentioned Swedish patent application, which can likewise e.g. form part of the AXE system and which may be used in a communication system in accordance with the above mentioned U.S. application.

The telephone exchange 212, in this case a local exchange, includes a computer 214 which controls connection equipment. The connection equipment consists of a subscriber interface 216, a switch equipment 218 and a trunk connection interface 220. The switch equipment 218 is able to connect telephone channels for telephone dialogues between the subscriber interface 216 and the trunk connection interface 220. The computer 214 controls the signalling from a subscriber 222 via a subscriber line 224 and the subscriber interface 216 to the local exchange 212. The computer 214 controls in the same way on the trunk side connection of trunk circuits 226 via the trunk connection interface 220 to the switch equipment 218. Furthermore, the computer 214 has an interface 228 to a signal network via signalling connections 230. The interface 228 is usually called signal terminal.

In the computer 214 a number of computer programs are executed which have different functions in the telephone exchange such as controlling the connection into circuit of dialogues or maintenance functions e.g. for getting charging information. Via the signal terminal 228 these programs may exchange signals with programs in other telephone exchanges.

The computer programs include, more particularly, two groups of programs, viz., on the one hand, a communication handling group 232 and, on the other hand, a service handling group 234. The two groups have different protocols, viz. for the group 232 a protocol 236 and for the group 234 a protocol 238. In a telephone network, in which a number of exchanges of the kind described are included, the service handling programs 234 in two exchanges handling a respective subscriber, establish direct protocols 238 between them. In the same way the communication handling programs 232 will communicate from exchange to exchange by means of the protocol 236.

Further details regarding telecommunications systems in which the invention may be applied, may as an example be obtained from the above mentioned U.S. application or Swedish patent application, and therefore require no further description here.

According to the present invention the internal communication between the service controlling entities included in logical nodes is controlled by means of rules stated in a generic protocol model, below denominated TSPM (Telecommunication Services Protocol Model). These rules prescribe lack of messages and use only of protocol parameters in the form of indivisible information transfer elements, which will be denominated TSPM defined parameters below. A TSPM defined parameter is the smallest data unit which is possible to transfer in accordance with TSPM. The TSPM defined parameters are distributed by a communication service, below denominated ITS (Information Transfer Service), having a parameter distribution function for these parameters.

Based upon the generic protocol model TSPM service protocols are specified, which each corresponds to a service, and are denominated ASP (Application Service Protocol) below. In case of applying the invention in the environment according to FIG. 1 several service protocols ASP would replace one internal protocol, e.g. the internal TUP protocol 142 as concerns the communication between the service managing programs included in the application modules 136, 138 and 140. In the environment according to FIG. 2 the internal communication between the service handling computer programs 234 as well as the internal communication between the communication handling computer programs 232 would in a similar way be performed via service protocols ASP according to the invention.

A protocol handling entity, below denominated ASPE (Application Service Protocol Entity), takes care of the protocol handling for a specific service according to the service protocol ASP. The service protocol ASP is used for interaction between ASPE:s, and therefrom it appears which TSPM defined parameters that shall be transferred.

The more detailed description below of embodiments of the invention will be carried through in steps in a way which per se may imply repetitions but also elucidates the connection between different aspects of the inventive idea. Furthermore the invention will, as an example, in certain cases be described with a particular focusing on use in the AXE system, although it is also generally applicable in other environments. As regards the AXE system specific concepts are included therein which will be identified and used further on.

Figure 3:
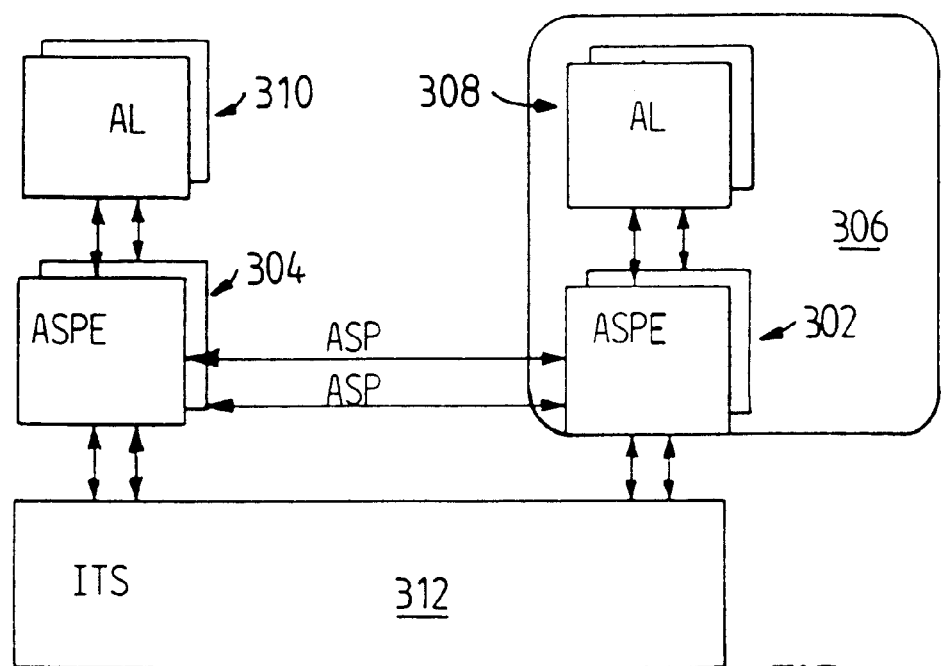
FIGS. 3 and 4 are schematic pictures for illustrating some terminology used henceforth in connection with the invention.
Figure 4:
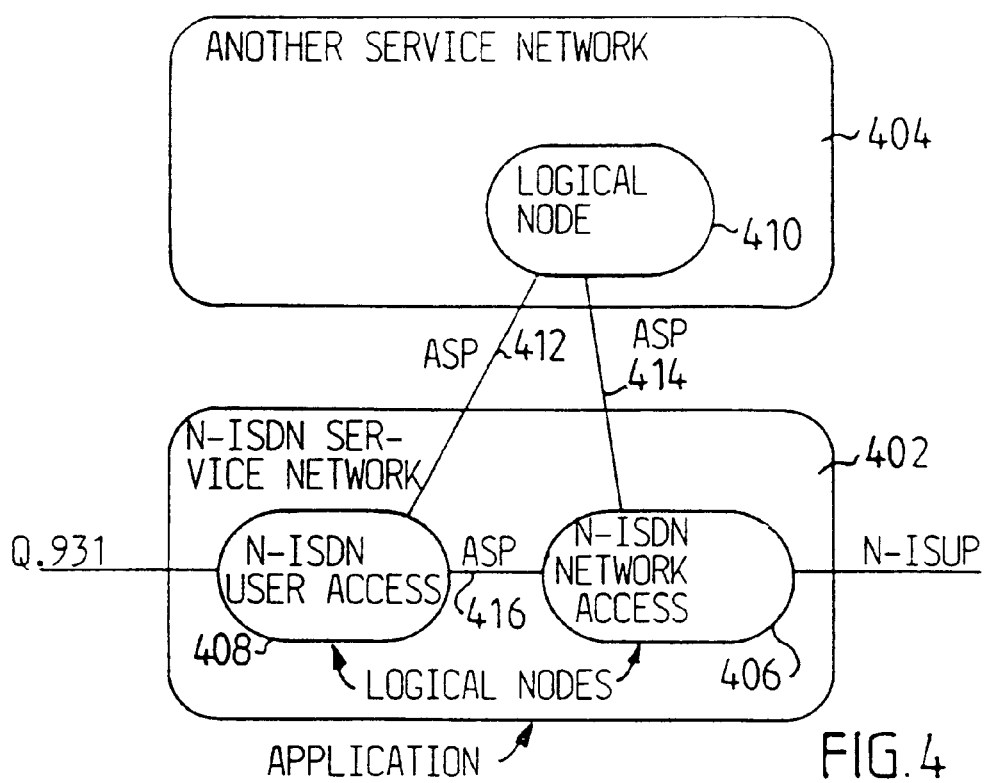

To begin, i.a. the above mentioned concepts TSPM, ASP, ASPE and ITS will be illustrated somewhat in more detail with reference to FIGS. 3 and 4.

The protocol model TSPM is in the example according to FIGS. 3 and 4 assumed to show the type of internal communication for AXE. By means of the rules stated in TSPM, ASP:s are defined which are used for communication between half-call processes. The half-call processes belong to the same or different telecommunications networks.

ASPE:s are implemented as protocol objects in a half-call process. In FIG. 3 two sets of ASPE:s are indicated at 302 and 304, respectively, the ASPE:s 302 being shown as included in a logical node 306.

The concept protocol object is defined in the AXE system as an object type that holds the behaviour of a communication protocol for communication between subsystems. An example of a protocol object is an object type that represents an external protocol such as TUP (Telephone User Part) or SCCP (Signalling Connection Control Part).

Protocol objects are part of the object types included in the system. They make it easier to understand the subsystem as they clarify its boundaries and give a clear view of the subsystem's interface.

Furthermore the concept half-call process is defined in the AXE system as a real time environment intended to control one party of a call. The half-call process environment which consists of heap, stack and execution functions, is limited to a specific processor.

In FIG. 3 a set of service controlling entities in the form of AL-functionalities (AL=Application Logic) in the logical node 306 is indicated at 308, and another set at 310. By AL is here meant, in connection with the present invention, the application logic for a service, i.e. in the present case the logic of a service controlling entity. For the corresponding service, AL-functionalities include application logic such as traffic management, the handling of supplementary services, interaction between services etc.

AL is implemented as a number of threads in a half-call process. A thread is an execution path in a half-call process with a program pointer and stack. There may be several threads within a half-call process. They all share the same heap and static data. A thread can set itself to wait for one or more half-call process events, and thereby let another thread start or resume execution.

The communication service ITS is indicated in FIG. 3 by means of a block 312. It transfers data between ASPE sets 302 and 304. The communication service ITS includes a parameter distribution function indicating the ASPE or ASPE:s to which each parameter may be sent. The parameter distribution function may be in the form of a list denominated PDL (Parameter Distribution List) in the example below. Each parameter may be sent to one or more ASPE:s. The arrows between the different functionalities shown in FIG. 3 indicate communication paths.

With reference to FIG. 4 TSPM has been used for designing ASPE:s for communication between logical nodes. In the figure an N-ISDN service network has been designated 402 and another service network 404. Typical logical nodes are N-ISDN network access at 406, N-ISDN user access at 408. A logical node in the service network 404 is designated 410. A service protocol defined in accordance with TSPM may be set up between logical nodes belonging to different service networks, but also between logical nodes belonging to the same service network. This is illustrated in FIG. 4, where the logical node 410 included in the service network 404 has TSPM connections 412 and 414 to the logical nodes 408 and 406 in the service network 402. Between the logical nodes 406 and 408 there is a TSPM defined communication 416.

In real time service-controlling entities in logical nodes communicate via a number of ASP:s between interacting services. TSPM defined parameters are transferred together with each ASP. Specification and implementations are made by application designers. TSPM enables addition of one or more new ASP:s to each logical node without adaption of existing ASP:s. In the present case the concept "half-call process" will be used in connection with description of execution. Otherwise the more general concept logical node will be used for describing the distribution of a service and its communication via its ASP:s.

Figure 5:
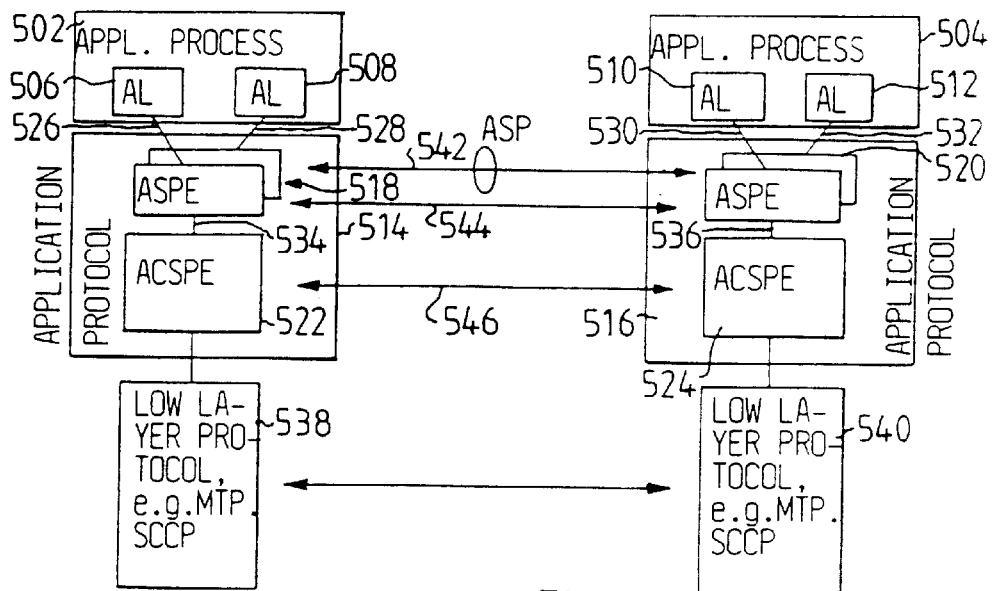
FIG. 5 illustrates a generic protocol model in accordance with the invention, FIG. 6 schematically illustrates an example of the protocol structure in a protocol model according to FIG. 5 by means of simple state machines, FIG. 7 in more detail shows an example of the protocol structure in a case in which an AXE N-ISDN user access interacts with an AXE N-ISDN network access.

With reference to FIG. 5 a generic protocol handling model to which the invention is applied, will now be described. It includes the following functionalities.

AP-functionality (Application Process) containing all service logic related to a distinct logical service node, i.e. several AL-functionalities. In FIG. 5 two AP functionalities at 502 and 504, respectively, are shown as an example.

AL-functionalities included in the AP-functionality and containing logic related to a specific service, e.g. Call Control, Closed User Groups (CUG). The AL functionalities form service controlling entities 506, 508 and 510, 512, which each are included in an AP functionality 502 and 504, respectively.

Two application protocol parts 514 and 516 each include, as an example, at 518 and 520, respectively, two sets of ASPE functionalities, as well as each an ACSPE functionality 522 and 524, respectively.

Each ASPE includes signalling support for a specific application logic AL, said signalling supports being indicated, as an example, at 526, 528 and 530, 532, for the ASPE sets 518 and 520, respectively.

The functionality ACSPE (Application Common Service Protocol Entity) includes the protocol state machine and performs unpacking/packing of parameters for a specific protocol, i.e. distribution and collection of tagged data to and from the relevant ASPE. The latter is indicated at 534 and 536 for the ASPE sets 518 and 520, respectively. If a tag is unrecognized the parameter is sent to a separate ASPE. There shall be no redevelopment of the ACSPE when additional ASPE:s are connected, but the distribution/collection tables in ACSPE will simply require updating.

Low layer protocol (LLP) entities 538 and 540 include nonapplication dependent protocols such as Q.921, MTP, SCCP and corresponding AXE internal low layer protocols.

The service protocol ASP describes the information flow that consists of parameters, between two ASPE:s indicated at 542 and 544, respectively.

A protocol ACSP (Application Common Service Protocol) describes both syntax and information flow between ACSPE:s, indicated at 546.

Figure 6:
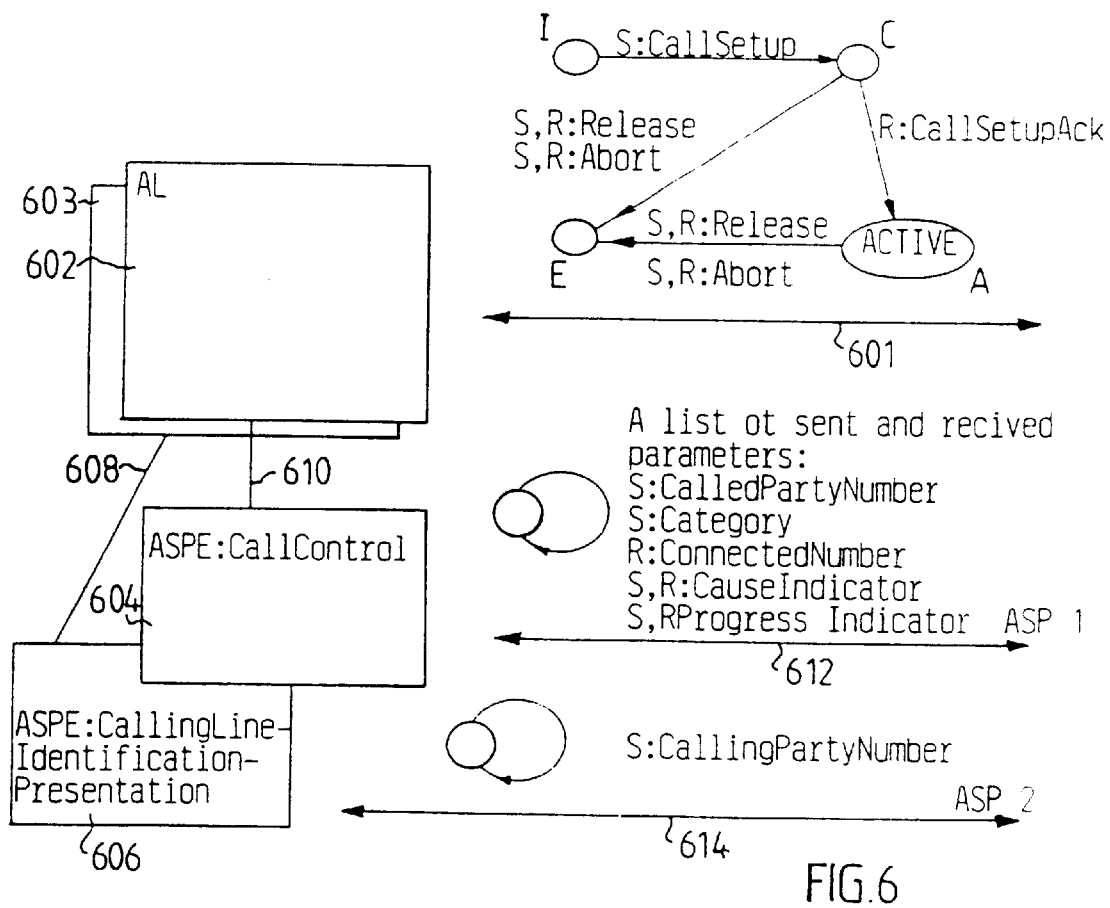

With reference to FIG. 6 a simple example of the protocol structure in TSPM will now be illustrated, based upon the description above of the protocol handling model in FIG. 5. As will appear the service protocol for an ASPE is very simple, since the protocol state machine includes only one state, viz. "ACTIVE". This results in the protocol only consisting of a list of parameters which are sent and received, respectively. The protocol state machine for an application logic AL is a more complete state machine which will reflect the traffic course which takes place over the protocol.

For the sake of simplicity the AP-functionality, corresponding to the AP-functionality 504 in the right half of FIG. 5 is omitted in FIG. 6. In the left half of FIG. 6 the two application logic functionalities 506 and 508 in FIG. 5 are represented by blocks 602 and 603. Furthermore two ASPE functionalities 604 and 606 with respective appurtenant relation connections 608 and 610 to the application logic functionalities 602 and 603, are shown. The ASPE:s 604 and 606 are assumed to take care of the protocol handling for the basic service "CallControl" and the supplementary service "CallingLineIdentificationPresentation", respectively. These denominations, stated as an example, for each service, as well as further denominations for parameters used in FIG. 6 are of a kind corresponding to parameters in ISDN, which is well known to the man of the art within the telecommunication art, cf. e.g. CCITT. They therefore do not require any further explanation here.

In FIG. 6 the upper arrow 601 may furthermore generally represent the communication between the application logic AL 508 and 510 in FIG. 5. Above this arrow an example is illustrated of the state machine for the application logic AL. The state "idle" is indicated with I, the state "call attempt" with C, the state "end state" with E, and the state "active" with A.

Above the arrows 612 and 614 there are shown, adjacent to a symbol for the respective one-state state machine, the respective protocols of the ASPE:s 604 and 606, the protocol in the first case being the indicated list of parameters which are sent and received, and the protocol in the second case being the indicated only parameter, which is sent.

Also as concerns that symbolized, in a way well known per se, by the three protocols shown, as an example, the man of the art within the telecommunications field will understand what this means. Here no closer explanation is therefore required either.

Figure 7:
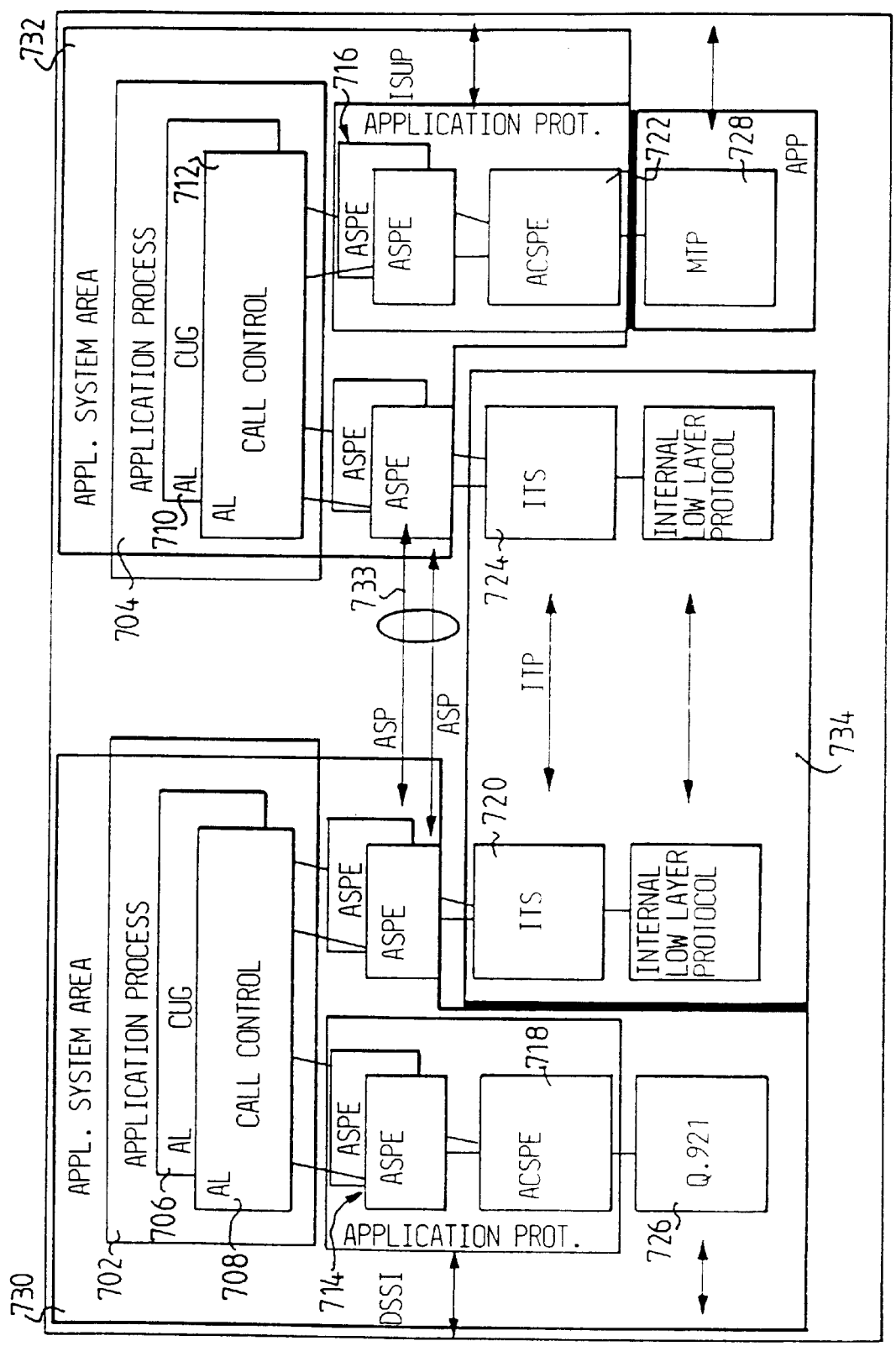

In FIG. 7 there is shown, for an AXE implementation selected as an example and having the same structure as in FIG. 5, the protocol structure in a case where an N-ISDN user access 730 interacts with an N-ISDN network access 732. The two AP functionalities are shown at 702 and 704. At 706, 708 and 710, 712 two AL functionalities are shown, as an example, to be included in the respective AP functionalities 702 and 704.

The two AP functionalities interact according to TSPM specified ASP protocols 733. Underlying protocol layers are shown at 734. At 718 and 722 ACSPE is shown in the respective application protocol. ACSPE is denominated ITS in the case of TSPM, indicated by 720 and 724, respectively. The low layer protocol in the case N-ISDN user access is Q.921 and for N-ISDN network access it is MTP, indicated by 726 and 728, respectively.

Low layer protocol entities 726 and 728 contain nonapplication dependent protocols Q.921 and MTP, respectively.

With reference to FIG. 8 the resulting TSPM implementation consists of a set of ASPE:s 802, 804, 806, 808 which are included in a logical node 810 and each handles the protocol for a specific service, as controlled by the AL application logic 812, 814, 816 and 818, respectively. The ASPE grouping is determined in connection with the AL application design. The structure is not known to other logical nodes, a fact that increases the design modularity.

The AL application designer describes the protocol state for the service in question and designs ASPE:s and AL. ITS is generic. The state machine for the service is located in the AL application logic 812, 814, 816 and 818, respectively. In real time ASPE:s are instantiated by ITS communication service at need. The ASPE:s may be regarded as simple parameter distributors and have no category dependency.

When a half-call process is created an instance 820 of ITS is created. An implementation of ITS will have two parameter distribution functions within a half-call process, viz. one function used for the originating half-call and one used for the terminating half-call.

The ITS instance 820 uses a parameter distribution function 822 to be able to distribute the received parameters to the right ASPE. In FIG. 8 the function 822 is indicated as consisting, for this object, of two list columns 824 and 826, containing parameters and corresponding ASPE:s, respectively.

The logical node 810 communicates via a number of ASP:s 802–808, indicated at 828, each terminating in a respective one of the four ASPE:s. When a message is received the ITS instance 820 distributes the parameters to the ASPE:s according to PDL 826. When messages are to be sent, PDL is not used. More particularly, the ASPE:s download the parameters to the ITS instance, and thereupon the AL application logic 812–818 instructs the ITS instance to send a message containing a number of parameters.

The functionality of the logic node 810 which communicates via ASP:s is shown as an example to be divided into four services, one per ASP 802–808: Call control CC, Call forwarding CF (including all different supplementary services associated with Call forwarding), UUS. (signalling user to user) and CUG (Closed User Group), respectively. For each service there is an ASPE, which has an originating part and a terminating part. At 830 in the logical node 810 entities for handling external protocols are indicated.

TSPM indicates a protocol structure, which will here be described more closely.

As mentioned previously, TSPM:s rules prescribe the absence of messages, which means that there are no messages in a TSPM based ASP protocol. The only way to transfer information is via TSPM defined parameters. Both call information, e.g. called party number, and events, such as "answer" and "disconnect" must be transferred via parameters. There are no mandatory parameters.

The data possible to transfer according to TSPM are divided into a set of indivisible parameters.

Each release of TSPM may include a number of global parameters defined and described in a reference manual for application designers. These global TSPM defined parameters may and should, as far as possible, be used by all applications. The reference manual is updated if needed at each new release of the basic system.

If the set of parameters in the TSPM reference manual is not sufficient, it is possible to create local TSPM defined parameters. The need for new TSPM defined parameters can arise from a new application needing to transfer a new type of data. One market may also need a market specific parameter. The local TSPM defined parameters must be defined and described in local reference manuals for application designers. Only the application/market that created the local TSPM defined parameters may use them. If it seems possible that other applications may want to use a local TSPM defined parameter, it should be made into a global TSPM defined parameter as soon as possible.

If new parameters are created, that are based on old ones, the relation between the old and the new parameter should be stated in the TSPM reference manual (or in the local TSPM manual).

Together with each parameter sent via an ASP, an instruction indicator is included which specifies what the receiving logical node should do with the parameter if it is not understood. Examples of instruction indicators are:

Report back
Discard the parameter
Clear the call

An application may not invent its own instruction indicators. The set of instruction indicators may only be expanded at new TSPM releases.

Generally instruction indicators are a mechanism used at compatibility procedures for handling of unknown information. This information may in a protocol such as BISUP be a message, a parameter in a message or a value in a parameter. For TSPM unknown information may have the form of only one parameter if it is the question of interaction between half-call processes.

To determine the correct behaviour, a node must know whether it is acting as a transit node or an end node before the instruction indicators are interpreted.

Unrecognized information may be sent further from one network access protocol to another network access protocol, e.g. N-ISUP only if the protocols have the same functional possibilities. Unrecognized information may however not be sent further on a user access protocol, e.g. DSS1. In the case that at least one of the external protocols is a user access protocol the call has thus end node interpretation and not transit node interpretation.

Instruction indicators have been defined for use in both broadband and narrow band network access protocols. The user access protocol for B-ISDN only supports a subdivision of these indicators due to the nature of the protocol and the communication section over which it works.

The instruction indicators are defined as separate fields for each function rather than as absolute values so that new fields may be added and still interact with older nodes without causing compatibility problems. Older nodes only look at the fields they know. When new fields are defined the existing fields must therefore be set in a way that an acceptable function is obtained with an older node which does not look at the new fields.

Suppose e.g. with reference to FIG. 9a that the instruction indicator bitmap is six bits long. When only bit four is set the significance of the instruction indicator is that a notification shall be sent back if the parameter is not recognized. Assume furthermore that for the next revision there is need for a new instruction indicator value, viz.: notify back if the parameter is not understood but don't do that if the call is in a disconnection state. This value can be coded by extending the bitmap combination from six to eight bits according to FIG. 9b. The new value may then be indicated by a bitmap combination with bits seven and four set. Thereby a satisfactory result is obtained both with the six-bitmap and the eight-bitmap.

An ASP protocol specified in accordance with TSPM is message-less, therefore only instruction indicators relating to parameters are required.

TSPM may also include rules to support functions dictated by instruction indicators used on external protocols:

a. Allow unrecognized parameters to be transparently transferred between two external protocols.

b. Allow unrecognized messages to be transparently transferred between two external protocols.

c. The originating/incoming half-call must know the type of terminating/outgoing half-call process with which it will be associated very early (before information is sent to the other half-call) so that it knows whether to act as a transit or end node, and if it is an end node, whether "pass on" is possible or not.

d. The terminating/outgoing half-call must know the type of originating/incoming half-call process with which it is associated (before information is sent to the other half-call) so that it knows whether to act as a transit or end node, and if it is an end node whether "pass on" is possible or not. To meet these requirements a number of parameters are defined for TSPM:

a. The type of originating half-call process. This parameter shall be sent forward in an ITS start message and indicate to the terminating half-call the type of the originating half-call, e.g. N-ISDN user access, B-ISDN network access. This information is used by the terminating half-call to know whether the originating half-call can "pass on" its unrecognized messages and parameters.

b. Unrecognized external message. This parameter can be sent in an ITS message if a half-call process has received an unrecognized message from its external protocol and has determined that it should be passed on to the associated half-call. The decision to "pass on" is based on examining external protocol instruction indicators and knowledge that the associated half-call can pass on messages from the own half-call's external protocol. The external message including instruction indicators, name and length are included as a part of this parameter.

c. Unrecognized external parameter. This parameter may be sent in an ITS message if a half-call process has received an unknown parameter from its external protocol and has decided that it should be passed on to the associated half-call. The decision to pass on is based upon an investigation of external protocol instruction indicators and knowledge that the associated half-call can pass on messages from the own half-call's external protocol. The external parameter including instruction indicators, name and length are included as a part of this parameter.

The analysis performed in the originating/incoming half-call yields a result indicating the outgoing/terminating half-call process type. This allows the originating/incoming half-call to determine if the terminating/outgoing half-call can pass on its unrecognized messages and parameters.

Each half-call process must have a table indicating other half-call types which can pass on their unknown messages and parameters. This table is checked when the other half-call is known. It must be possible to update these tables if new half-call processes are added to the system.

Referring to FIG. 10, which illustrates the structure of a TSPM defined parameter, the parameter may include a number of fields. In the example shown these fields consist of a field 1002 for parameter name, a field 1004 for a length indicator for the parameter, a field 1006 for the instruction indicators. Furthermore there may be one or more other fields, exemplified at 1008 and 1010, which each has a value area with a specific meaning. One example is the parameter "Address information" with the field "Type of Number". The value area may be one of the following:

0=unknown
1=local
2=national

At development of a service there should be specific demands that this service may be able to interact with the same type of service in other logical nodes. Since services in these other logical nodes, however, could be updated, or new logical nodes may appear, there must always be a support for handling unknown parameters.

As an aid for handling unexpected parameters the earlier described instruction indicator is used in association with each parameter. The instruction indicator set by the sending logical node suggests measures to be performed if the parameter is not understood by the receiving logical node.

When a parameter is received which is not expected by any ASPE, ITS sends the parameter to an UP ASPE, where UP stands for "Unrecognized parameter", which is ASPE for signalling not understood.

The following examples of interaction may be mentioned.

If a terminating half-call process requests the A number from an originating half-call process and finds that the request is not understood it should be possible to continue without presentation of the A number.

If the other logical node turns out to be "too incompatible", the call should be released. This may e.g. be the case if the other side does not understand an essential parameter such as "connect", "B number", etc.

If a narrow-band logical node obtains a request to set up a broadband connection it should reject the call attempt.

Figure 11:
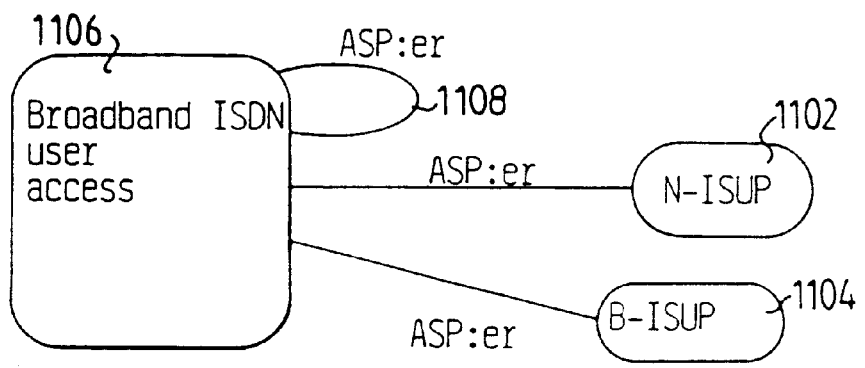
FIG. 11 illustrates a network example, in which a broadband ISDN user access node must be able to communicate with itself, with a broadband ISDN network access node and with a narrow band ISDN user access node.

Referring to FIG. 11 an AXE telecommunications system, as an example, may consist of a narrow-band ISDN network access node 1102, a broadband ISDN network access node 1104 and a broadband ISDN user access node 1106. When a call is made from a subscriber in the user access node 1106, a half-call process is started. This half-call process will communicate via a number of ASP:s towards another half-call process in the network. In this example this may be performed towards anyone of the three nodes, including the node 1106 itself, the latter indicated at 1108. The same ASPE set of the user access node 1106 is used when communicating with the other logical nodes.

To establish the interaction in the logical nodes involves per se additional work for the applications. However, the benefit is greater by avoiding the need of a centralized and complex entity which shall handle all types of interaction and which must be updated whenever a logical node has been updated. In a case such as the network example in FIG. 11 the design of each of the three logical nodes must be possible to be independent of the design of the other ones. It should also be possible to update/redesign one of the logical nodes without studying the internal structure of the other logical nodes and without updating them.

Figure 12:
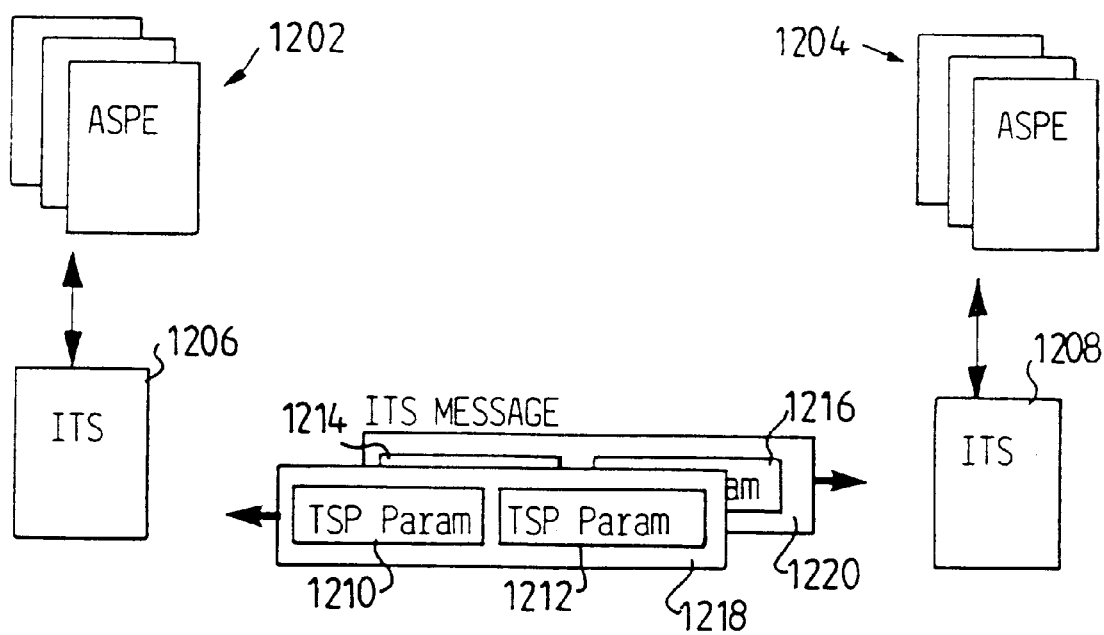
FIG. 12 illustrates how messages transmitted by the communication service transport parameters included in the protocol according to the invention.

FIG. 12 illustrates how two logical nodes, indicated by corresponding ASPE sets 1202 and 1204, via ITS instances 1206 and 1208, respectively, interchange TSPM defined parameters 1210, 1212, 1214, 1216 transported by ITS messages 1218 and 1220.

ITS uses a small set of messages and a correspondingly simple state machine. ITS messages have no meaning to the ASP protocol and need not be known by the application designer. ITS uses an underlying dialogue service.

Figure 13:
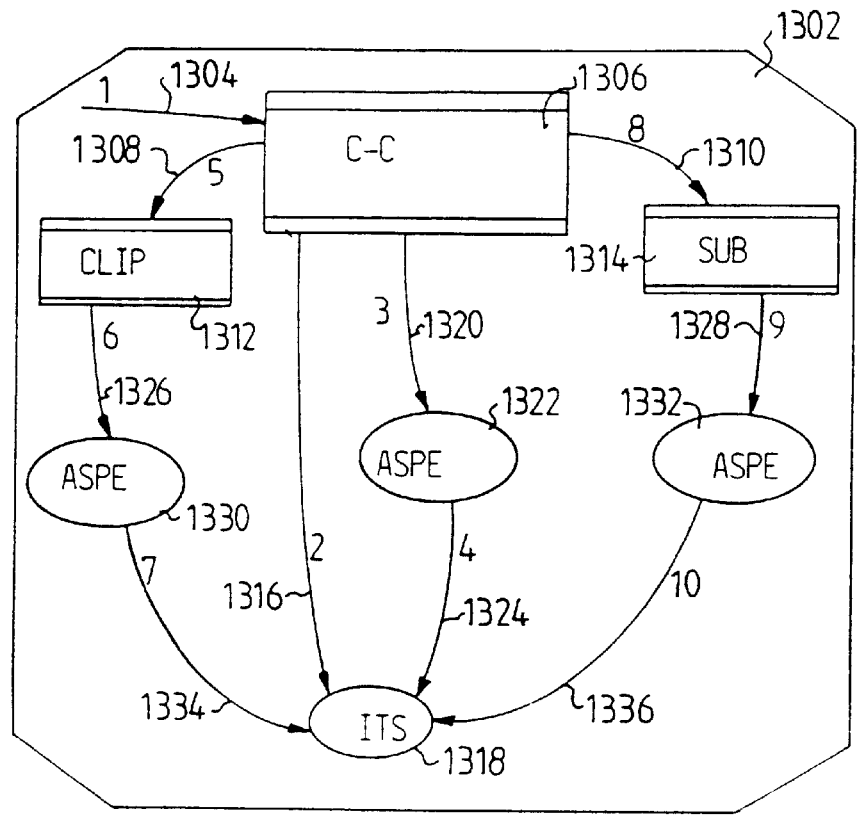
FIG. 13 illustrates the start up phase of a half-call process.

In FIG. 13 the starting up phase for a half-call process is shown. ASPE:s and control logic may call ITS methods via an interface. All ASPE:s may e.g. be derived from a C++ basic class for ASPE protocol objects, whereby ITS may call methods in ASPE:s via another interface for distributing parameters obtained from the other side.

When a call attempt appears, a start up function establishes a dynamic process 1302 for the originating half-call. At first an execution thread creates, arrow 1304, the originating call control logic 1306. Already at the instantiation the originating call control logic performs flow binding, arrows 1308, 1310, where it decides which extension flows, exemplified at 1312 and 1314 as supplementary services CLIP (Calling Line Identification Presentation) and SUB-addressing, respectively, that may be allowed to be added to the basic flow of the call control logic 1306.

The call control logic 1306 instantiates, arrow 1316, ITS 1318 when an address information analysis has identified the system towards which the call attempt is directed. When ITS 1318 is started the call control logic 1306 may instantiate, arrow 1320, its ASPE 1322. The ASPE 1322 obtains a pointer to ITS 1318 either from its control logic 1306 or by reading a half-call specific data base. When the ASPE 1322 is instantiated it links itself, arrow 1324, to ITS 1318 and at the same time sends a list of the parameters to which it decides to subscribe when messages are received from the terminating side. The linking towards ITS is performed by a method "subscribeParameters". Parameters that shall be transported towards the terminating side are sent to ITS 1318 from ASPE 1322 by a method "prepareParameters".

When the extension flows 1312 and 1314 take over the execution they can also create, arrows 1326 and 1328, their own ASPE:s 1330 and 1332, respectively, which are likewise linked, arrows 1334 and 1336, respectively, to ITS 1318, and subscribe to parameters from ITS and transfer parameters to ITS.

In FIG. 13 numbers 1–10 positioned adjacent a respective flow arrow, indicate the sequence of order for the respective allocating calls.

Of course all services needing to transfer TSPM defined parameters in the first message towards the terminating side need to create ASPE:s and be linked to ITS during the first job of the half-call process. Other services, such as COLP (Connected Line Identification Presentation), may set up its ASPE later on.

When the start up function on the terminating side creates the half-call process on this side, the control logic is instantiated for call control. It then creates an ITS instance and an AL instance in the same way as on the originating side. The services which may receive parameters in the first message towards the terminating side must be instantiated together with their ASPE:s at start up of the half-call process. Thereafter the rest of the control logic and ASPE:s are established as on the originating side.

At instantiation the ITS will not have any knowledge of the half-call process in which it is created. It will receive routing information from the call control logic and also the object pointers for all ASPE:s which may distribute parameters.

As ITS receives information about the parameter distribution it will successively dynamically build its parameter distribution list PDL.

Figure 14:
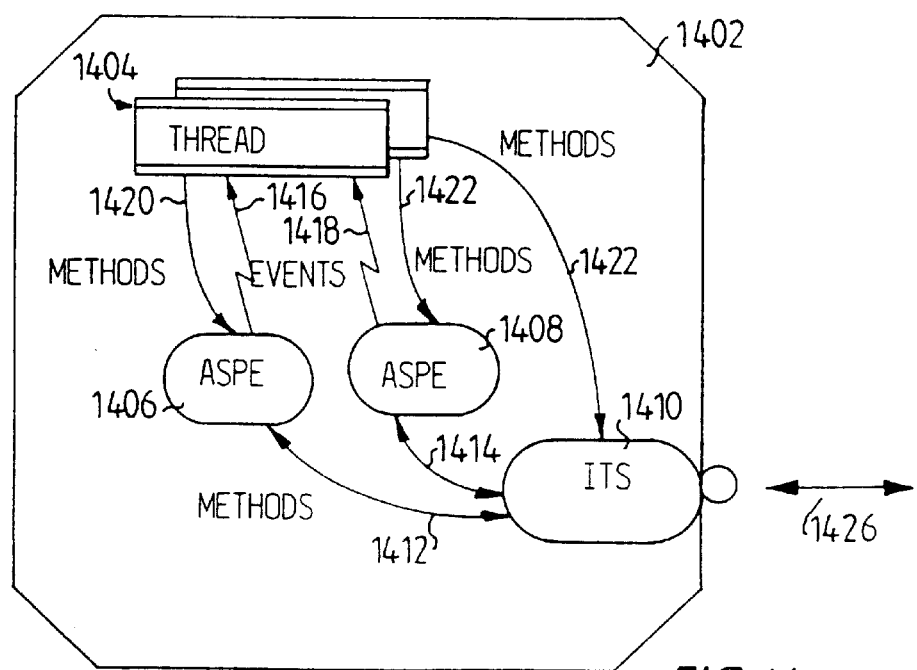
FIG. 14 illustrates the active phase of a half-call process.

Referring to FIG. 14 an example of the active phase of a half-call process will be described. In a half-call process 1402 AL is implemented as threads 1404 and ASPE:s 1406, 1408 as protocol objects.

When ITS 1410 receives a message it calls a generic method 1412, 1414 to the ASPE:s 1406, 1408, as indicated in the parameter list PDL. The ASPE:s identify the parameters and interpret their included data. When a parameter, or a specific set of parameters, is received from ITS, an ASPE 1406 or 1408 yields an event 1416 and 1418, respectively, to AL 1404.

When a message is sent the threads 1404 instruct the ASPE:s, by methods 1420 and 1422, respectively, to send parameters to ITS 1410. Thereupon a thread 1404 instructs, 1424, ITS 1410 to send an ITS message. The ITS instance 1410 will use an address point as a port, indicated at 1426, for exchanging ITS messages.

As a conclusion will now follow a practical example of use of the method according to the invention for internal communication. For this purpose the service COLP will be used as an illustrative example. This service makes it possible for a calling subscriber to identify the subscriber accepting the call. Due to the fact that different pass on call services may be invoked during set up of the call, the subscriber accepting the call need not be the same as the one to which the call was directed.

When an application uses the service COLP two TSPM defined parameters are used: COLP inquiry and COLP number. If these are not already present in the TSPM library they need to be created. For the service to be able to work there must be a service controlling entity for each traffic side of the call.

At the start of the call the parameter COLP inquiry is transferred from the calling side of the call to the other side. When and if the call is accepted the TSPM defined parameter COLP number is sent towards the calling subscriber.

The following may be noted with regard to the above example:

The protocol has been extended by the addition of the two above mentioned TSPM defined parameters.

The protocol is available for all application designers.

The protocol does not include any application logic, i.e. it is not described in the protocol documentation whether the parameters are necessary for the service, or in which order or grouping they may be sent. This, which is necessary for the service to be able to work, is specified and implemented in the application logic (AL).

When the above described service is not necessary for the call to be able to be carried to an end, the instruction indicators associated with the parameters should be set to "reject parameter".

By setting the instruction indicator according to the above, the service will be able to be successively introduced into the network. The service will work if and only if the service is introduced into both the node executing the service logic for the calling subscriber and the node executing the service logic for the subscriber accepting the call. The setup call will work independently of whether the service works.

If the service functionality is increased this can result in a new TSPM defined parameter having to be created due to the fact that a value range in one of the existing parameters has to be increased. This service upgrading can then be introduced successively in the network. Until all nodes have been updated both the old parameter and the new one should be sent.

For realizing the above described example there is, in the originating node, code that e.g. executes the code (logic):

If the subscriber has the service COLP activated, then send the TSPM defined parameter COLP inquiry to the terminating side.

If the TSPM defined parameter COLP number then is received and the call has not failed, then send the number in question on the external protocol to the subscriber.

The man of the art understands how this logic can be transferred to a state machine, a flow diagram or code, and therefore no detailed description is needed here. Once again, it should, however, be emphasized that this exists in the application—not in the protocol or its documentation.

What is claimed is:

1. A method for internal communication in a telecommunication system having logical networks for telecommunication services, logical nodes in the logical networks, and service controlling entities that control a service for a part in a call and are specified in the logical nodes and realized in software that executes functions in these, comprising the step of:

performing communication between the service controlling entities of different nodes in accordance with a generic protocol model by exchanging protocol parameters in the form of indivisible information transfer elements, which are distributed in messages lacking meaning to the service controlling entities, in a communication service having a parameter distribution function for the protocol parameters.

2. A method for structuring software in a telecommunication system having logical networks for telecommunication services, logical nodes in the logical networks, and service controlling entities that control a service for a part in a call and are specified in the logical nodes and realized in software that executes functions in these, comprising the step of:

storing in the system, for controlling internal communication between service controlling entities in traffic courses in the telecommunication system, software components based on a generic protocol model, which prescribes exchange of protocol parameters in the form of indivisible information transfer elements, which are distributed in messages lacking meaning to the service controlling entities, in a communication service having a parameter distribution function for the protocol parameters.

3. The method of claim 1, comprising the step of specifying, based upon the generic protocol model, service protocols corresponding to a respective service.

4. The method of claim 1, comprising the step of associating with the generic protocol model a number of defined control parameters that constitute a smallest data unit possible to transfer in the service protocol.

5. The method of claim 3, comprising the step of specifying a service protocol by choosing arbitrarily a number of protocol parameters for the service and defining new protocol parameters at need.

6. The method of claim 3, comprising the step of providing a protocol specification for each service protocol including a list of sent and received protocol parameters.

7. The method of claim 3, wherein the service protocol lacks application logic.

8. The method of claim 3, comprising the step of providing a protocol handling entity within an application for managing protocol handling for a certain service according to the service protocol.

9. The method of claim 8, comprising the step of updating a protocol handling entity without requiring upgrading protocol handling entities interacting therewith.

10. The method of claim 8, comprising the steps of performing communication between two service controlling entities by transferring, by the communication service, data between the protocol handling entities, including indicating by the parameter distribution function present in the communication service to which protocol handling entities each protocol parameter shall be sent, and using a parameter distribution list for the originating service controlling entity and a parameter distribution list for the terminating service controlling entity.

11. The method of claim 10, comprising the step of performing system upgrading by loading new or modified protocol handling entities for affecting the parameter distribution function during execution.

12. The method of claim 10, comprising the step of using an application logic for instructing the protocol handling entities by methods to send parameters to the communication service, and for instructing the communication service to send a message.

13. The method of claim 8, comprising the step of configuring a protocol handling entity in association with an application design so as to keep the structure thereof substantially unknown to other logical nodes.

14. The method of claim 12, comprising the step of specifying for each protocol handling entity parameters required for generating an event for a service, and locating a state machine for the service in the application logic.

15. The method of claim 12, comprising the step of providing in one interface per service between the application logic and a protocol handling entity a specification of events to be sent from the protocol handling entity to the application logic, and methods to be sent from the application logic to the protocol handling entity.

16. The method of claim 12, comprising the step of ejecting from a protocol handling entity an event to the application logic in case of receiving a parameter, or a specific set of parameters, from the communication service.

17. The method of claim 1, comprising the step of introducing in an application logic all logic for traffic handling, handling of supplementary services and interaction between services.

18. The method of claims 1, comprising the step of associating with each protocol parameter an instruction indicator indicating to a receiving protocol handling entity what to do with the parameter if it is not understood.

19. The method of claim 3, comprising the step of using by the communication service a set of messages and a corresponding state machine, the messages having no meaning to the service protocol.

20. A software system for a telecommunication system having logical networks for telecommunication services, logical nodes in the logical networks, and service controlling entities that control a service for a part in a call, and are specified in the logical nodes and realized in software that executes functions in these, comprising controlling internal communication between the service controlling entities in traffic courses in the telecommunication systems, by using rules stated in a generic protocol model, which prescribe exchange of protocol parameters in the form of indivisible information transfer elements, which are distributed in messages lacking meaning to the service controlling entities by a communication service with a parameter distribution function for the protocol parameters.

21. The system of claim 20, comprising service protocols which correspond to a respective service and are specified based on the generic protocol model.

22. The system of claim 21, wherein the generic protocol model is associated with a number of defined protocol parameters constituting a smallest data unit possible to transfer in the service protocol.

23. The system of claim 21, wherein a specification of a service protocol includes a suitable number of protocol parameters for the service chosen arbitrarily, and new protocol parameters if needed.

24. The system of claim 21, wherein there is a protocol specification for each service protocol including a list of sent and received parameters.

25. The system of claim 21, wherein the service protocol lacks an application logic.

26. The system of claim 21, wherein a protocol handling entity within an application takes care of the protocol handling for a specific service according to the service protocol.

27. The system of claim 26, wherein updating of a protocol handling entity does not require upgrading protocol handling entities interacting therewith.

28. The system of claim 26, wherein, in case of communication between two service controlling entities, the communication service transfers data between the protocol handling entities, the parameter distribution function present in the communication service indicating to which protocol handling entities each protocol parameter shall be sent, and two parameter distribution lists are used, one for use by the originating service controlling entity, and the other for use by the terminating service controlling entity.

29. The system of claim 28, wherein, in case of system upgrading, new or modified protocol handling entities are loaded, which will affect the parameter distribution function during execution.

30. The system of claim 28, wherein an application logic instructs the protocol handling entities by methods to send parameters to the communication service whereupon the application logic instructs the communication service to send a message.

31. The system of claim 26, wherein configuration of a protocol handling entity is determined in connection with an application design in a way that the structure is substantially not known to other logical nodes.

32. The system of claim 31, wherein, for each protocol handling entity, the application designer specifies parameters required for generating an event to the service, a state machine for the service being located in an application logic.

33. The system of claim 26, wherein one interface per service between an application logic and a protocol handling entity contains a specification of events to be sent from the protocol handling entity to the application logic, and methods to be sent from the application logic to the protocol handling entity.

34. The system of claim 26, wherein, in case of receiving a parameter, or a specific set of parameters from the communication service, a protocol handling entity emits an event to an application logic.

35. The system of claim 20, wherein an application logic includes all logic for traffic handling, handling of supplementary services and interaction between services.

36. The system of claim 20, wherein each protocol parameter is associated with an instruction indicator indicating what a receiving protocol handling entity shall do with the parameter if it is not understood.

37. The system of claim 21, wherein the communication service uses a set of messages and a corresponding state machine, the messages lacking meaning to the service protocol.

38. A software system for a telecommunication system having logical networks for telecommunication services, logical nodes in the logical networks, and service controlling entities that control a service for a part in a call, and are specified in the logical nodes and realized in software that executes functions in these, comprising
   a controller that controls internal communication between service controlling entities in traffic courses in telecommunication system, wherein the controller uses rules stated in a generic protocol model, which prescribe lack of messages, and use only protocol parameters in the form of indivisible information transfer elements.

39. The system of claim 38, wherein the generic protocol model is associated with a number of defined protocol parameters constituting a smallest data unit possible to transfer in the service protocol.

40. The system of claim 38, wherein a specification of a service protocol includes a suitable number of protocol parameters for the service chosen arbitrarily, and new protocol parameters if needed.

41. The system of claim 38, comprising service protocols which correspond to a respective service and are specified based on the generic protocol model.

42. The system of claim 38, wherein there is a protocol specification for each service protocol including a list of sent and received parameters.

43. The system of claim 38, wherein the service protocol lacks an application logic.

44. The system of claim 39, wherein a protocol handling entity within an application takes care of the protocol handling for a specific service according to the service protocol.

45. The system of claim 44, wherein updating a protocol handling entity does not require upgrading protocol handling entities interacting therewith.

46. The system of claim 38, wherein, in case of communication between two service controlling entities, the communication service transfers data between the protocol handling entities, the parameter distribution function present in the communication service indicating to which protocol handling entities each protocol parameter shall be sent, and two parameter distribution lists are used, one for use by the originating service controlling entity, and the other for use by the terminating service controlling entity.

47. The system of claim 44, wherein configuration of a protocol handling entity is determined by an application designer in a way that the structure will not be known to other logical nodes.

48. The system of claim 46, wherein, for each protocol handling entity, the application designer specifies parameters required for generating an event to the service, a state machine for the service being located in an application logic.

49. The system of claim 44, wherein one interface per service between an application logic and a protocol handling entity contains a specification of events to be sent from the protocol handling entity to the application logic, and methods to be sent from the application logic to the protocol handling entity.

50. The system of claim 38, wherein an application logic includes all logic for traffic handling, handling of supplementary services and interaction between services.

51. The system of claim 38, wherein each protocol parameter is associated with an instruction indicator indicating what a receiving protocol handling entity shall do with the parameter it is not understood.

52. A method for internal communication in a telecommunication system that includes logical networks for telecommunication services, logical nodes in the logical networks, and service controlling entities that control a service for a part in a call, and are specified in the logical nodes and realized in software that executes functions in these, comprising the step of
   performing communication between the service controlling entities of different nodes in accordance with a generic protocol model, by exchanging protocol parameters which are distributed by a communication service having a parameter distribution function for said parameters.

53. A method for structuring software in a telecommunication system that includes logical networks for telecommunication services, logical nodes in the logical networks, and service controlling entities that control a service for a part in a call, and are specified in the logical nodes and realized in software that executes functions in these, comprising the step of
   storing in the system, for controlling internal communication between the service controlling entities in traffic courses in the telecommunication system, software components based upon a generic protocol model that prescribes exchange of protocol parameters which are distributed by a communication service having a parameter distribution function for the parameters.

54. The method of claim 52, comprising the steps of specifying, based upon the generic protocol model, service protocols corresponding to a respective service, providing a protocol handling entity within an application that takes care of protocol handling for a certain service according to the service protocol, and providing that the communication service transfers data between the protocol managing entities.

55. The method of claim 54, comprising the step of providing a protocol specification for each service protocol including list of sent and received parameters.

56. The method of claim 52, comprising structuring the software so that, when performing communication between two service controlling entities, the communication service transfers data between the protocol handling entities, and the parameter distribution function present in the communication service indicates to which protocol handling entities each protocol parameter shall be sent, and providing two parameter distribution lists to be used in connection therewith, one parameter distribution list for the originating service controlling entity, and the other parameter distribution list for the terminating service controlling entity.

57. The method of claim 54, wherein the configuration of a protocol handling entity is determined so as to keep the structure thereof substantially unknown to other logical nodes.

58. The method of claim 54, comprising the step of specifying for each protocol handling entity parameters required for generating an event for a service, and locating a state machine for the service in an application logic.

59. The method of claim 52, comprising the step of providing in one interface per service between an application logic and a protocol handling entity a specification of events to be sent from the protocol handling entity to the application logic, and methods to be sent from the application logic to the protocol handling entity.

60. The method of claim 54, comprising the step of performing system upgrading by loading new or modified protocol handling entities for affecting the parameter distribution function during execution.

61. The method of claim 54, wherein an application logic instructs the protocol handling entities by methods to send parameters to the communication service, and the application logic then instructs the communication service to send a message.

62. The method of claim 54, wherein when receiving a parameter, or a certain set of parameters from the communication service, a protocol handling entity emits an event to the application.

63. The method of claim 52, comprising the steps of specifying, based upon the generic protocol model, service protocols, each corresponding to a service, and providing that the communication service uses a set of messages and a corresponding state machine, the messages having no meaning for the service protocol.

64. A software method for telecommunication systems, that include logical networks for telecommunication services, logical nodes in the logical networks, and service controlling entities that control a service for a part in a call, and are specified in the logical nodes and realized in software that executes functions in these, comprising the step of providing in the system, for controlling internal communication between the service controlling entities in traffic courses in the telecommunication system, rules based upon a generic protocol model, prescribing exchange of protocol parameters which are distributed by a communication service having a parameter distribution function for said parameters.

65. The method of claim 64, comprising the steps of specifying, based upon the generic protocol model, service protocols corresponding to respective services, providing a protocol handling entity within an application that takes care of protocol handling for a certain service according to the respective service protocol, and providing that the communication service transfers data between the protocol managing entities.

66. The method of claim 65, comprising the step of providing a protocol specification for each service protocol including a list of sent and received parameters.

67. The method of claim 64, comprising the steps of structuring the software method so that, when performing communication between two service controlling entities, the communication service transfers data between the protocol handling entities, and the parameter distribution function present in the communication service indicates to which protocol handling entities each protocol parameter shall be sent, and providing two parameter distribution lists to be used in connection therewith, one parameter distribution list for the originating service controlling entity, and the other parameter distribution list for the terminating service controlling entity.

68. The method of claim 64, wherein the configuration of a protocol handling entity is determined in association with an application design so as to keep the structure thereof substantially unknown to other logical nodes.

69. The method of claim 68, comprising the step of specifying, for each protocol handling entity, parameters required for generating an event for a service, and locating a state machine for the service in an application logic.

70. The method of claim 65, comprising the step of providing in one interface per service between an application logic and a protocol handling entity a specification of events to be sent from the protocol handling entity to the application logic, and methods to be sent from the application logic to the protocol handling entity.

71. The method of claim 65, comprising the step of providing system upgrading by loading new or modified protocol handling entities for affecting the parameter distribution function during execution.

72. The method of claim 65, comprising the step of providing that an application logic instructs the protocol handling entities by methods to send parameters to the communication service, and the application logic then instructs the communication service to send a message.

73. The method of claim 65, wherein when receiving a parameter, or a certain set of parameters from the communication service, a protocol handling entity emits an event to an application.

74. The method of claim 64, comprising specifying, based upon the generic protocol model, service protocols corresponding to respective services, and providing that the communication service uses a set of messages and a corresponding state machine, the messages having no meaning for the service protocol.

75. A method for internal communication in a telecommunication system that includes logical networks for telecommunication services, logical nodes in the logical networks, and service controlling entities that control a service for a part in a call, and are specified in the logical nodes and realized in software that executes functions in these, comprising the step of performing communication between the service controlling entities of different nodes in accordance with a generic protocol model, by exchanging protocol parameters which are distributed in messages lacking meaning to the service controlling entities.

76. A method for structuring software in a telecommunication system that includes logical networks for telecommunication services, logical nodes in the logical networks, and service controlling entities that control a service for a part in a call, and are specified in the logical nodes and realized in software that executes functions in these, comprising the step of storing in the system, for controlling internal communication between the service controlling entities in traffic courses in the telecommunication system, software components based upon a generic protocol model that prescribes exchange of protocol parameters which are to be distributed in messages lacking any meaning to the service controlling entities.

77. The method of claim 75, wherein an application logic includes all logic for traffic handling, handling of supplementary services and interaction between services.

78. The method of claim 75, comprising the step of creating an implementation of an interface according to the generic protocol model with two parameter distribution functions, one used for the originating service controlling entity, and the other used by the terminating service controlling entity.

79. The method of claim 75, comprising the step of associating each protocol parameter with an instruction indicator indicating what a receiving protocol handling entity shall do with the parameter if it is not understood.

80. A software system for a telecommunication system that includes logical networks for telecommunication services, logical nodes in the logical networks, and service controlling entities that control a service for a part in a call, and are specified in the logical nodes and realized in software that executes functions in these, comprising a controller that controls internal communication between the service controlling entities in traffic courses in the telecommunication system according to rules based on a generic protocol model, which prescribe exchange of protocol parameters which are to be distributed in messages lacking meaning to the service controlling entities.

81. The system of claim 80, wherein the controller includes an application logic that includes all logic for traffic handling, handling of supplementary services and interaction between services.

82. The system of claim 80, wherein an implementation of an interface, created according to the generic protocol model, has two parameter distribution functions, one used for the originating service controlling entity, and the other used by the terminating service controlling entity.

83. The system of claim 80, wherein each protocol parameter is associated with an instruction indicator indicating what a receiving protocol handling entity shall do with the parameter if it is not understood.

84. A method for internal communication in a telecommunication system having logical networks for telecommunication services, logical nodes in the logical networks, and service controlling entities that control a service for a part in a call, and are specified in the logical nodes and realized in software that executes functions in these, comprising the steps of:

performing communication between the service controlling entities of different nodes according to a general protocol model by exchange of protocol parameters in the form of indivisible information transfer elements; and arbitrarily selecting, when specifying a service protocol, a number of defined control parameters suitable for the service, and new parameters when needed.

85. The method of claim 84, further comprising the step of providing a protocol specification for each service protocol including a list of sent and received parameters.

86. The method of claim 84, wherein, for communication between two service controlling entities, the communication service transfers data between the protocol handling entities, including indicating by a parameter distribution function present in the communication service to which protocol handling entities each protocol parameter shall be sent, and using one parameter distribution list for the originating service controlling entity, and another parameter distribution list for the terminating controlling service controlling entity.

87. The method of claim 84, further comprising the step of associating with the generic protocol model a number of defined protocol parameters constituting a smallest data unit possible to transfer in the service protocol.

88. The method of claim 87, comprising the step of providing a protocol handling entity within an application for managing protocol handling for a specific service according to the service protocol.

89. The method of claim 88, further comprising the step of determining a configuration of a protocol handling entity in association with an application design so as to keep the structure thereof substantially unknown to other logical nodes.

90. The method of claim 89, further comprising the step of specifying for each protocol handling entity parameters required for generating an event for a service, and locating a state machine for the service in an application logic.

91. The method of claim 84, further comprising the step of providing, in one interface per service between an application logic and a protocol handling entity, a specification of events to be sent from the protocol handling entity to the application logic, and methods to be sent from the application logic to the protocol handling entity.

92. A method for internal communication in a telecommunication system having logical networks for telecommunication services, logical nodes in the logical networks, and service controlling entities that control a service for a part in a call, and are specified in the logical nodes and realized in software that executes functions in these, the method comprising the steps of:

performing communication between the service controlling entities by a generic protocol model, based on which there are specified service protocols which each correspond to a service; and selecting arbitrarily, when specifying a service protocol, a suitable number of protocol parameters for the service, and defining new protocol parameters at need.

93. The method of claim 92, wherein there is a protocol specification for each service protocol, the protocol including a list of sent and received parameters.

94. The method of claim 92, further comprising the step of providing a protocol handling entity within an application to take care of the protocol handling for a specific serve according to the service protocol.

95. The method of claim 94, further comprising the step of updating a protocol handling entity without upgrading protocol handling entities interacting therewith.

96. The method of claim 94, further comprising the step of determining a configuration of a protocol handling entity in connection with the application design in a way that the structure of the entity is substantially not known to other logical nodes.

97. The method of claim 96, further comprising the steps of specifying, for each protocol handling entity, the parameters required for generating an event for the service, and locating a state machine for the service in an application logic.

98. The method of claim 94, further comprising the steps of providing in one interface per service between an application logic and a protocol handling entity a specification of events to be sent from the protocol handling entity to the application logic, and methods to be sent from the application logic to the protocol handling entity.

99. A software method for a telecommunication system that includes logical networks for telecommunication services, logical nodes in the logical networks, and service controlling entities that control a service for a part in a call, and are specified in the logical nodes and realized in software that executes functions in these, comprising the step of using, for controlling internal communication between the service controlling entities in traffic courses in the telecommunication system, rules stated in a generic protocol model, based on which service protocols corresponding to a respective service are specified;

wherein, when specifying a service protocol, there is selected arbitrarily a number of protocol parameters for the service, and new protocol parameters at need.

100. The method of claim 99, wherein there is a protocol specification for each service protocol including a list of sent and received parameters.

101. The method of claim 99, wherein the service protocol lacks an application logic.

102. The method of claim 99, wherein a protocol handling entity within an application takes care of the protocol handling for a specific service according to the service protocol.

103. The method of claim 102, wherein updating a protocol handling entity does not require upgrading protocol handling interacting therewith.

104. The method of claim 102, wherein configuration of a protocol handling entity is determined in a way that the structure of the entity is substantially not known to other logical nodes.

105. The method of claim 104, wherein, for each protocol handling entity, parameters required for generating an event to the service are specified, a state machine for the service being located in an application logic.

106. The method of claim 99, wherein one interface per service between an application logic and a protocol handling entity contains a specification of events to be sent from the protocol handling entity to the application logic, and methods to be sent from the application to the protocol handling entity.

* * * * *

UNITED STATES PATENT AND TRADEMARK OFFICE
CERTIFICATE OF CORRECTION

PATENT NO. : 6,282,202 B1
DATED : August 28, 2001
INVENTOR(S) : Keith Mainwaring et al.

It is certified that error appears in the above-identified patent and that said Letters Patent is hereby corrected as shown below:

<u>Title page,</u>
The PCT filing date (Code (22)) is incorrect. The filing date of the counterpart PCT application was October 24, 1995.

Signed and Sealed this

Thirtieth Day of April, 2002

*Attest:*

*Attesting Officer*

JAMES E. ROGAN
*Director of the United States Patent and Trademark Office*